US006487892B1

(12) United States Patent
Ito et al.

(10) Patent No.: US 6,487,892 B1
(45) Date of Patent: Dec. 3, 2002

(54) FAULT DETECTION APPARATUS AND METHOD FOR FUEL VAPOR PURGE SYSTEM

(75) Inventors: Tokiji Ito, Toyota (JP); Noriyuki Iden, Toyota (JP); Yuichi Kohara, Toyota (JP); Shuichi Hanai, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/592,295

(22) Filed: Jun. 12, 2000

(30) Foreign Application Priority Data

Jun. 29, 1999 (JP) .......................................... 11-183478

(51) Int. Cl.$^{7}$ ................................................ G01M 3/04

(52) U.S. Cl. ........................ 73/49.2; 73/49.7; 73/118.1; 123/520; 702/51

(58) Field of Search ............................... 73/49.7, 118.1; 123/520; 702/51

(56) References Cited

U.S. PATENT DOCUMENTS 5,172,672 A * 12/1992 Harada ....................... 123/520
5,297,527 A 3/1994 Suzuki et al. ............... 123/520
5,345,917 A 9/1994 Maruyama et al.
5,398,661 A * 3/1995 Denz et al. ................. 123/520
5,542,397 A * 8/1996 Takahata et al. ............ 123/520
5,572,981 A * 11/1996 Pfleger et al. .............. 123/698
5,592,923 A * 1/1997 Machida ..................... 123/520
5,671,718 A 9/1997 Curran et al.
5,718,210 A * 2/1998 Ito et al. ..................... 123/520
5,767,395 A * 6/1998 Goto et al. ................ 73/118.1
5,931,141 A * 8/1999 Chino ........................ 123/520
6,082,337 A * 7/2000 Fujimoto et al. ........... 123/520
6,105,556 A * 8/2000 Takaku et al. .............. 123/520
6,148,803 A * 11/2000 Majima et al. ............. 123/520

FOREIGN PATENT DOCUMENTS

JP 8-240161 9/1996 .......... F02M/25/08

* cited by examiner

*Primary Examiner*—Daniel S. Larkin
*Assistant Examiner*—C D Garber
(74) *Attorney, Agent, or Firm*—Oliff & Berridge, PLC

(57) ABSTRACT

A test apparatus for a fuel vapor purge system that performs frequent tests. The testing apparatus detects leakage of fuel vapor from a system passage by sealing the system passage and monitoring changes in the pressure. After the test, the apparatus applies atmospheric pressure to the system passage. Therefore, the pressure in the system passage is quickly restored to atmospheric pressure.

12 Claims, 5 Drawing Sheets

FAULT DETECTION APPARATUS AND METHOD FOR FUEL VAPOR PURGE SYSTEM

BACKGROUND OF THE INVENTION

The present invention relates to a fault detection apparatus for a purge system supplying (purging) fuel vapor from a fuel tank to an intake system of an engine.

Vehicles typically carry a purge system for purging fuel vapor from a fuel tank to an engine intake passage. The purge system includes a canister for collecting fuel vapor from the fuel tank, a vapor passage connecting the fuel tank with the canister, and a purge passage connecting the canister with an intake passage. Fuel vapor in the canister is supplied-to the intake passage through the purge passage.

If there is a hole or a crack in the purge passage, fuel vapor leaks from the purge system. A test apparatus exists for detecting fuel vapor leakage from the purge system. For example, Japanese Unexamined Patent Publication No. 8-240161 describes an apparatus that lowers the pressure in the purge system and then monitors pressure changes in the purge system to detect fuel vapor leakage.

Such an apparatus performs testing only when certain preconditions are fulfilled to improve the accuracy of fault detection. The preconditions include that the velocity of a vehicle is stable, the cumulative value of the pressure change in the fuel tank is within a certain values and the amount of fuel vapor generated in the fuel tank within a certain time is small (that is, the pressure change in the fuel tank within a certain time is small). However, when a vehicle is actually running, the velocity of the vehicle frequently changes. Also, fuel in the tank is shaken when the vehicle runs on a rough road, which increases the amount of fuel vapor generated in the tank. Accordingly, the preconditions are seldom fulfilled when the vehicle operates. As a result, the frequency of performing the testing is relatively low.

In recent years, there has been a need to improve the testing performance. For example, it is necessary to quickly and accurately detect holes and cracks having a maximum dimension of at least about 0.5 mm (hereinafter called 0.5 mm holes). The necessary preconditions for detecting 0.5 mm holes are more strict than those for detecting holes having a maximum dimension of at least about 1.0 mm (hereinafter called 1.0 mm holes). Therefore, the preconditions for detecting 0.5 mm holes are less frequently fulfilled, which reduces the frequency of performing the detection.

The prior art apparatus lowers the pressure in the purge system before detecting 1.0 mm holes. Then, when no 1.0 mm hole is found, detection of 0.5 mm holes is performed. Accordingly, when there is a 0.5 mm hole in the purge system, the pressure in the purge system gradually changes because of fuel vapor leakage through the hole. Therefore, it takes a relatively long time before the pressure in the purge system is stable and the preconditions for detecting 0.5 mm holes are fulfilled. If the pressure in the purge system changes during the 0.5 mm holes detection, the detection is cancelled. As a result, the detection of 0.5 mm holes is less frequently performed.

SUMMARY OF THE INVENTION

An objective of the present invention is to provide a testing apparatus for accurately and quickly detecting a small leakage in a purge system.

To achieve the above objective, the present invention provides a method for testing a purge system that purges fuel vapor in a fuel tank to an intake passage of an engine through a system passage connected with the fuel tank. The method includes changing the pressure in the system passage to a first predetermined pressure; sealing the system passage; monitoring the change of the pressure in the sealed system passage and detecting leakage of fuel vapor from the system passage; and restoring the pressure of the system passage when a testing is demanded again after the sealing step.

The present invention further provides a testing apparatus for a purge system that purges fuel vapor in a fuel tank to an intake passage of an engine through a system passage connected with the fuel tank. The apparatus is structured as follows. A pressure sensor detects the pressure in the system passage. A first valve sets the pressure in the system passage to a predetermined value. A second valve for seals the system passage. A controller monitors a signal from the pressure sensor and controls the first and second valves. The controller sets the pressure in the system passage by controlling the first and second valves when the pressure in the system passage is stable for a predetermined period. Then the controller seals the system passage and detects leakage of fuel vapor from the system passage by monitoring the change of the pressure in the sealed system passage. The controller restores the pressure in the system passage when a testing is demanded again after the sealing step.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A fault detection apparatus for a purge system according to one embodiment of the present invention will now be described.

Figure 1:
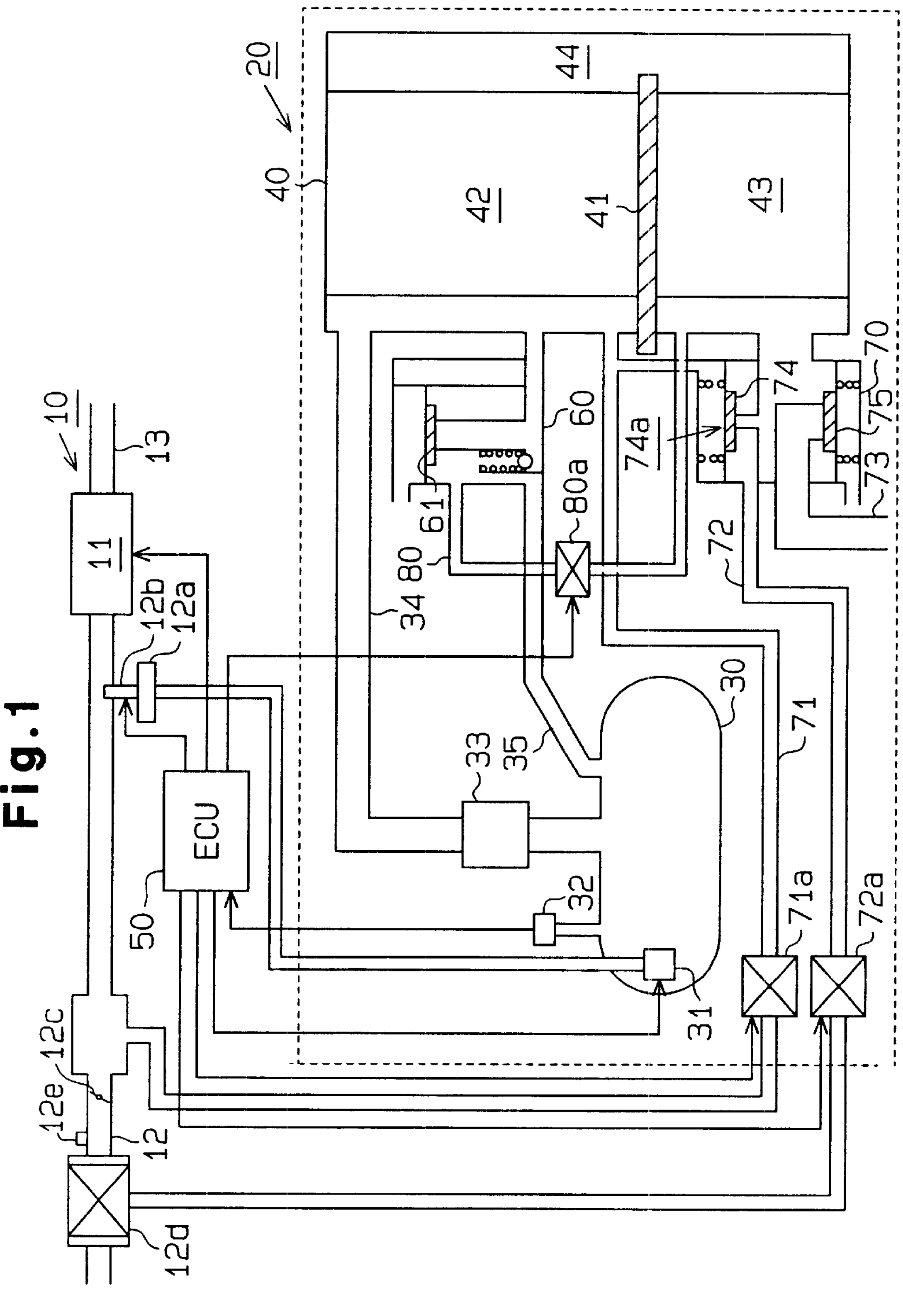
FIG. 1 is a diagrammatic view showing a diagnosis apparatus and a purge system according to one embodiment of the present invention.

FIG. 1 shows a vehicle purge system and its diagnosis apparatus. An engine 10 includes a combustion chamber 11, an intake passage 12, and an exhaust passage 13. A throttle valve 12*c* is located in an upstream part of the intake passage 12. The throttle valve 12*c* varies the cross-sectional area of the intake passage 12 in accordance with the operation of a gas pedal (not shown). An air cleaner 12*d* and an airflow meter 12*e* are located upstream of the throttle valve 12*c*. The air cleaner 12*d* cleans intake air, and the airflow meter 12*e* detects the amount of airflow to the engine 10. During the operation of the engine 10, fuel in a tank 30 is pumped to a delivery pipe 12*a* by a fuel pump 31 and then injected into the intake passage 12 by an injection valve 12*b*.

The purge system 20 includes a canister 40 and a purge passage 71. The canister 40 collects fuel vapor from the fuel tank 30, and the purge passage 71 purges fuel vapor from the canister 40 to the intake passage 12. A pressure sensor 32 and a breather control valve 33 are located on the upper wall of the fuel tank 30. The pressure sensor 32 measures the pressure in the fuel tank 30 and the passages connected to the tank 30. In other words, the pressure sensor 32 measures the pressure in a purge system passage that includes the fuel tank 30 and the passages connected to the tank 30. The breather control valve 33 is a diaphragm-type differential pressure valve. The breather control valve 33 opens when the pressure in the fuel tank 30 is greater than the pressure in a breather passage 34 by a predetermined value (for example, when the tank is filled with gasoline) and releases fuel vapor to the breather passage 34. The breather passage 34 is connected to the canister 40. The tank 30 is also connected to a vapor passage 35. The inner diameter of the vapor passage 35 is smaller than that of the breather passage 34. The vapor 35 is connected to the canister 40 through a system pressure control valve 60. The system pressure control valve 60 is diaphragm-type differential pressure valve. When the pressure in the fuel tank 30 is greater than that in the canister by a predetermined value, a diaphragm 61 of the system pressure control valve 60 opens, which connects the fuel tank 30 to the canister 40.

An adsorber material such as activated carbon is accommodated in the canister 40. Fuel vapor is absorbed in the adsorber material and is temporarily stored in the canister 40. Fuel vapor is desorbed from the adsorber material when the pressure in the canister 40 is reduced.

The canister 40 is connected to the intake passage 12 through the purge passage 71. A purge control valve 71*a* is located in the purge passage 71. Also, the canister 40 is connected to an atmosphere intake passage 72 and an atmosphere discharge passage 73 through an atmosphere valve 70. The atmosphere intake passage 72 is connected to an air cleaner 12*d* through an atmosphere intake valve 72*a*.

The atmosphere valve 70 includes first and second diaphragms 74, 75. A space 74*a*, which is above the first diaphragm 74 as shown in FIG. 1, is connected to the purge passage 71. When the pressure in the purge passage 71 is below a certain value, the first diaphragm 74 opens and permits the atmospheric air to flow from the atmosphere intake passage 72 into the canister 40. When the pressure in the canister 40 is above a certain value, the second diaphragm 75 opens and releases extra air from the canister 40 to the atmosphere discharge passage 73.

First and second adsorber chambers 42, 43 are defined in the canister 40 by a partition plate 41. The adsorber chambers 42, 43 are filled with adsorber material and are connected by a breathable filter 44. The first adsorber chamber 42 is connected to the fuel tank 30 through the vapor passage 35 and the breather passage 34. The second adsorber chamber 43 is connected to the atmosphere intake passage 72 and the atmosphere discharge passage 73 through the atmosphere valve 70. When the purge control valve 71*a* opens, the first adsorber chamber 42 is connected to the intake passage 12 through the purge passage 71.

Accordingly, fuel vapor is supplied to the first adsorber chamber 42 through the vapor passage 35 and the breather passage 34. The fuel vapor is temporarily adsorbed by the adsorber material in the first adsorber chamber 42. Then, the fuel is desorbed from the adsorber material and is supplied to the intake passage 12 through the purge passage 71. When discharging air in the canister 40 to the atmosphere discharge passage 73, the gas in the canister 40 passes through the first and second adsorber chambers 42, 43. Therefore, fuel vapor remaining in the gas in the canister 40 is adsorbed by the adsorber material of the first and second adsorber chambers 42, 43, which prevents fuel vapor from leaking from the purge system 20.

A depressurization passage 80 connects the system pressure control valve 60 and the second adsorber chamber 43. The depressurization control valve 80*a* is located in the depressurization passage 80. When the depressurization control valve 80*a* opens, the system pressure control valve 60 is connected to the second adsorber chamber 43. When the purge control valve 71*a* opens and the system pressure control valve 60 opens, the canister 40 is connected to the intake passage 12, which reduces the pressure in the canister 40. At this time, the first adsorber chamber 42, the filter 44, the second adsorber chamber 43, the depressurization passage 80, the system pressure control valve 60, the vapor passage 35, the fuel tank 30, and the breather passage 34 are connected to the purge passage 71. This forms the purge system passage.

The apparatus of the present embodiment detects leakage of gas from the system passage and malfunctions of the control valves 71*a*, 72*a*, and 80*a*.

An electronic control unit (ECU) 50 controls the fuel injector 12*b*, the fuel pump 31, the purge control valve 71*a*, the atmosphere intake valve 72*a*, and the depressurization control valve 80*a* and detects faults of in purge system 20.

Figure 2:
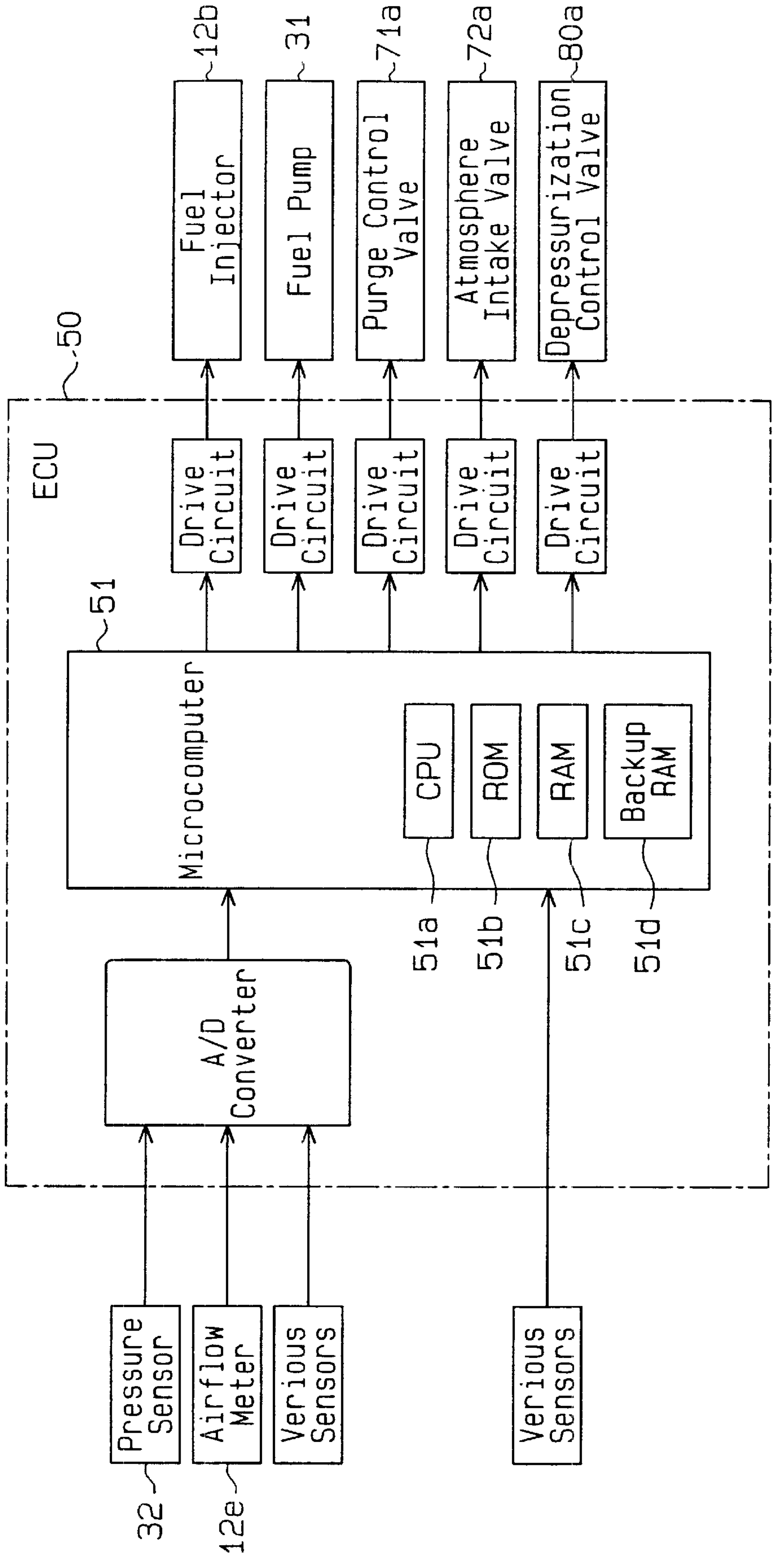
FIG. 2 is a schematic block diagram of the ECU of FIG. 1.

As shown in FIG. 2, the ECU 50 includes a microcomputer 51, A/D converter circuit, and various drive circuits. The microcomputer 51 includes a CPU 51*a*, a ROM 51*b*, a volatile RAM 51*c*, and a backup RAM 51*d*.

Signals from various sensors, such as, the pressure sensor 32, the airflow meter 12*e*, an engine speed sensor, and a cylinder sensor, are supplied to the microcomputer 51 through the A/D converter circuit and are used to control the engine 10.

The fuel injector 12*b*, the fuel pump 31, the purge control valve 71*a*, the atmosphere intake valve 72*a*, and the depressurization control valve 80*a* are driven by the corresponding drive circuits connected to the output ports of the microcomputer 51. The ECU 50 controls the engine 10 in accordance with the signals from the sensors. The ECU 50 also controls the purge control valve 71*a*, the atmosphere intake valve 72*a*, and the depressurization control valve 80*a* while monitoring a signal from the pressure sensor 32 to detect faults of the purge system 20.

The operation of the purge system 20 will now be described.

When the pressure in the fuel tank 30 exceeds a certain level, the system pressure control valve 60 opens. This permits fuel vapor to flow from the fuel tank 30 to the canister 40. When the pressure in the fuel tank 30 suddenly increases, the breather control valve 33 is opened. Then, a greater amount of fuel vapor flows from the fuel tank 30 to the canister 40. Fuel vapor in the canister 40 is adsorbed by the adsorber material.

When the purge control valve 71*a* is opened, the canister 40 is connected to the intake passage 12, which reduces the pressure in the canister 40. When the atmosphere intake valve 72*a* is opened, new air is introduced into the canister 40 from the air cleaner 12*d* through the atmosphere intake passage 72. This ventilation causes fuel vapor to be desorbed from the adsorber material and purged to the intake passage 12 through the purge passage 71.

Figure 5:
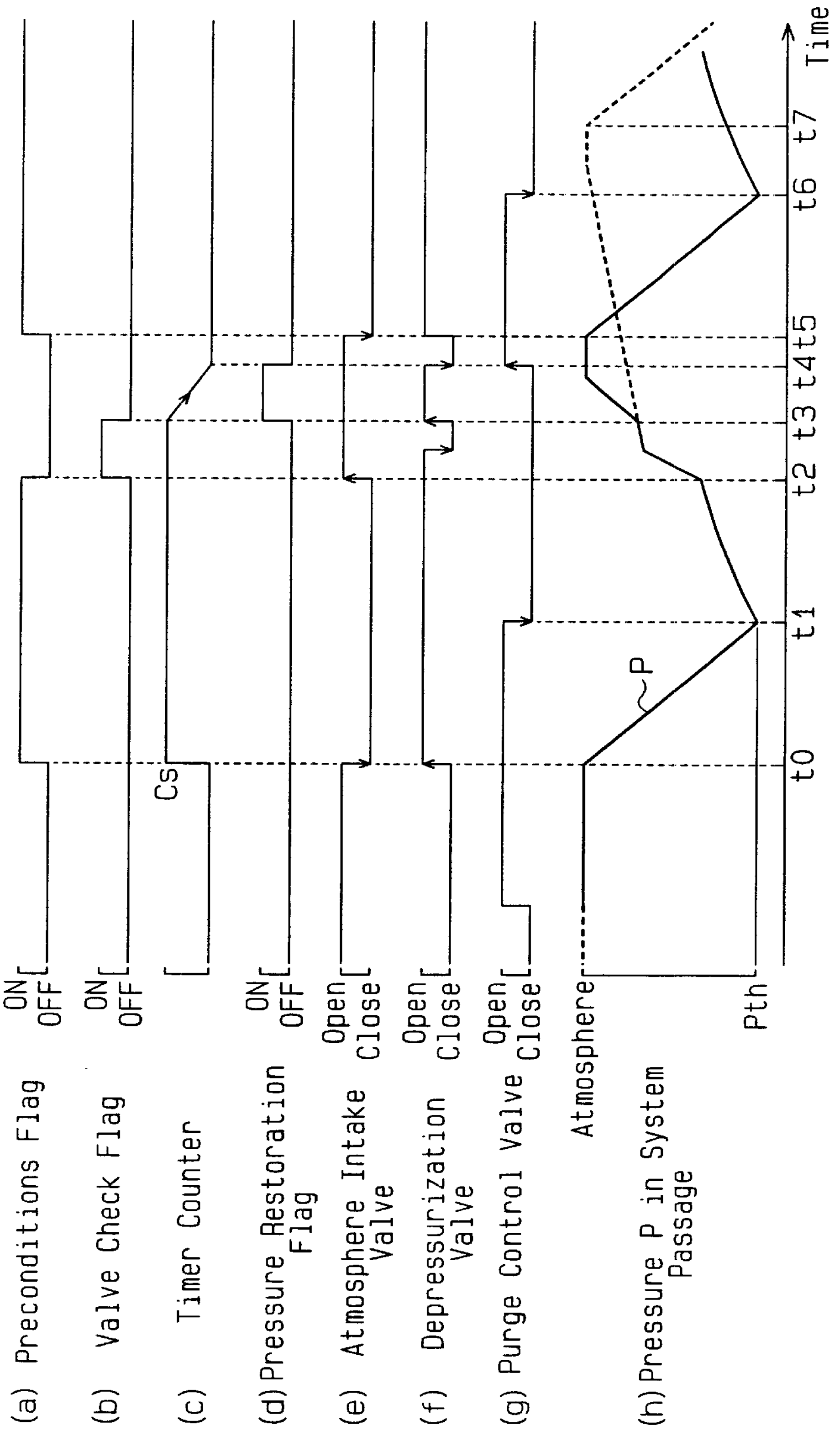
FIG. 5 is a time chart of a diagnosis process according to one embodiment.

A diagnosis process of the ECU 50 will now be described with reference to FIGS. 3 and 5.

Figure 3:
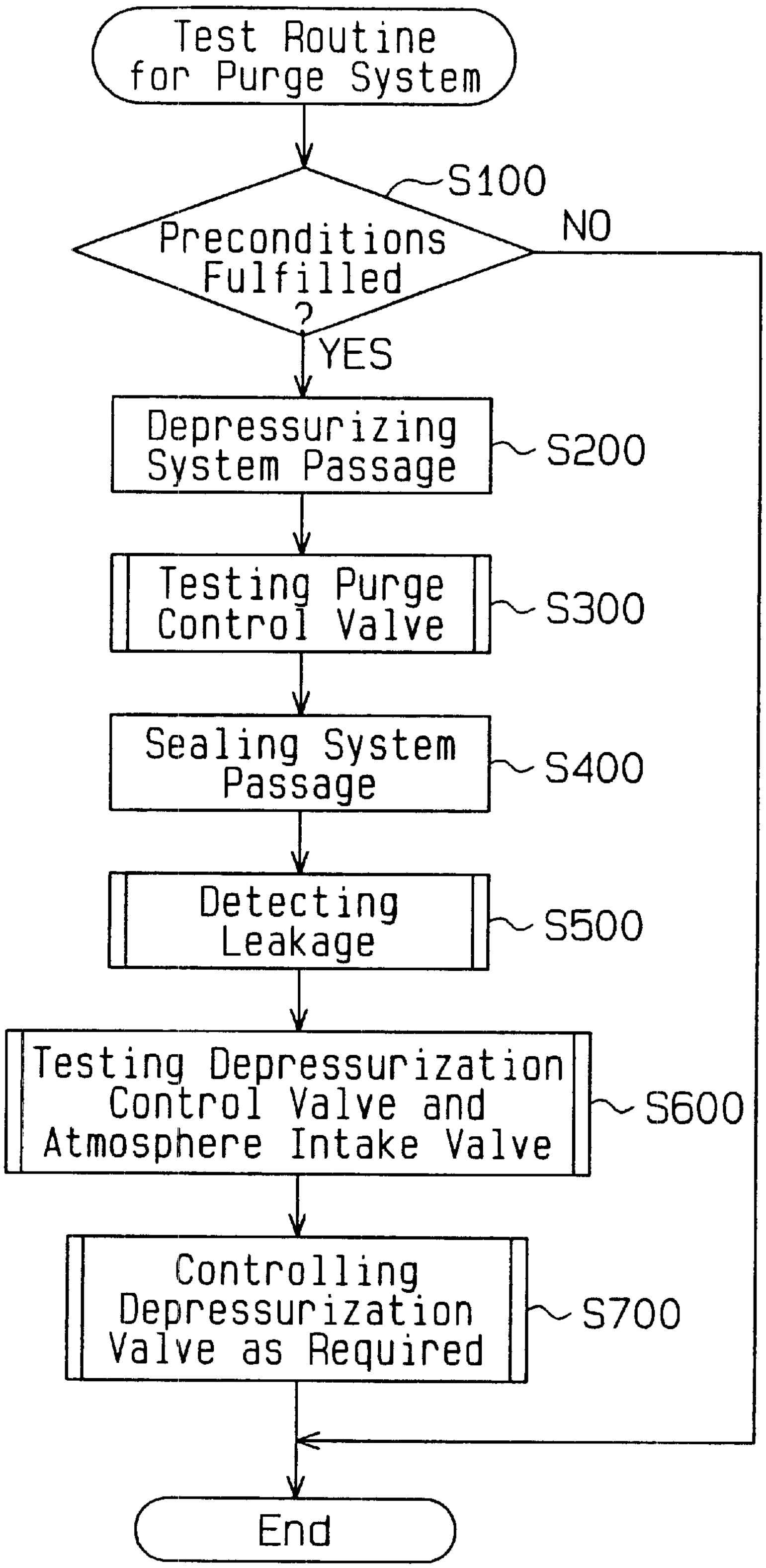
FIG. 3 is a flowchart of a diagnosis routine according to one embodiment.

As shown in FIG. 3, a routine for detecting faults in the purge system 20 is executed by the ECU 50 at predetermined intervals, for example, every 65 ms. Also, the routine is executed within a predetermined period after the start of the engine, for example, within fifty minutes. As shown in FIG. 5, fuel vapor is purged right before the time t0.

At step S100, the ECU 50 judges whether preconditions for testing are fulfilled. Detection of 1.0 mm holes and detection of 0.5 mm holes are performed, for example, when the following two conditions (b1), (b2) are fulfilled.

(b1) Generation of fuel vapor is stable for a certain period. In other words, the pressure in the tank 30 is stable.

(b2) A vehicle is running normally. In other words, the change of pressure in the system passage is less than a predetermined value, and the vehicle speed is less than a predetermined value.

When both conditions (b1), (b2) are fulfilled, the ECU 50 turns on a precondition flag and moves on to step S200. When at least one of the conditions (b1), (b2) is not fulfilled, the ECU turns off a precondition flag and temporarily terminates the routine.

At step S200, the ECU 50 starts reducing the pressure in the system passage. As shown by the time to in FIG. 5, the ECU 50 opens the depressurization control valve 80*a* and closes the atmosphere intake valve 72*a* while the purge control valve 71*a* is open. Accordingly, the system passage is connected to the exterior of the system only through the intake passage 12. This reduces the pressure in the system passage.

At step S300, the ECU 50 monitors the change of the pressure in the system passage and detects a malfunction of the purge control valve 71*a*. For example, when the reduction of the pressure in the system passage is slow or is stopped, the ECU 50 judges that the purge control valve 71*a* is malfunctioning.

At step S400, when the pressure in the fuel tank 30 is below a predetermined value Pth, the ECU 50 closes the purge control valve 71*a* and seals the system passage (at t1 in FIG. 5). The ECU 50 also detects a malfunction of the purge control valve 71*a* when closing the purge control valve 71*a*.

At step S500, the ECU 50 monitors the change of the pressure in the sealed system passage. Then, the 50 detects leakage of fuel vapor based on the speed of the change of the pressure (in a period from t1–t2). At step S500, if a test is not properly completed (for example, when the detection of 0.5 mm holes is not performed after depressurization or when the fuel vapor leakage detection is terminated), a test is demanded again. Then, when the preconditions for the test fulfilled, the ECU 50 reduces the pressure in the system passage again.

At step S600; the ECU 50 tests the atmosphere intake valve 72*a* and the depressurization control valve 80*a* for faults. In detail, the ECU 50 monitors the change of pressure in the system passage after opening the atmosphere intake valve 72*a* and thus tests the atmosphere intake valve 72*a*. The ECU 50 also monitors the change of the pressure in the system passage after closing the depressurization control valve 80*a* and diagnoses the depressurization control valve 80*a*. These tests are performed while the valve check flags are turned on (in a period from the time t2 to the time t3).

At step S700, the ECU 50 increases the pressure in the system passage to substantially the same level as the pressure of the atmosphere (pressure restoration control). At this time, the atmosphere intake valve 72*a* is opened, the depressurization control valve 80*a* is opened, and the purge control valve 71*a* is closed (in a period from the time t3 to the t4).

The test routine of the purge system 20 is repeated in a predetermined period (for example, fifty minutes after starting the engine) until an appropriate result is obtained.

Figure 4:
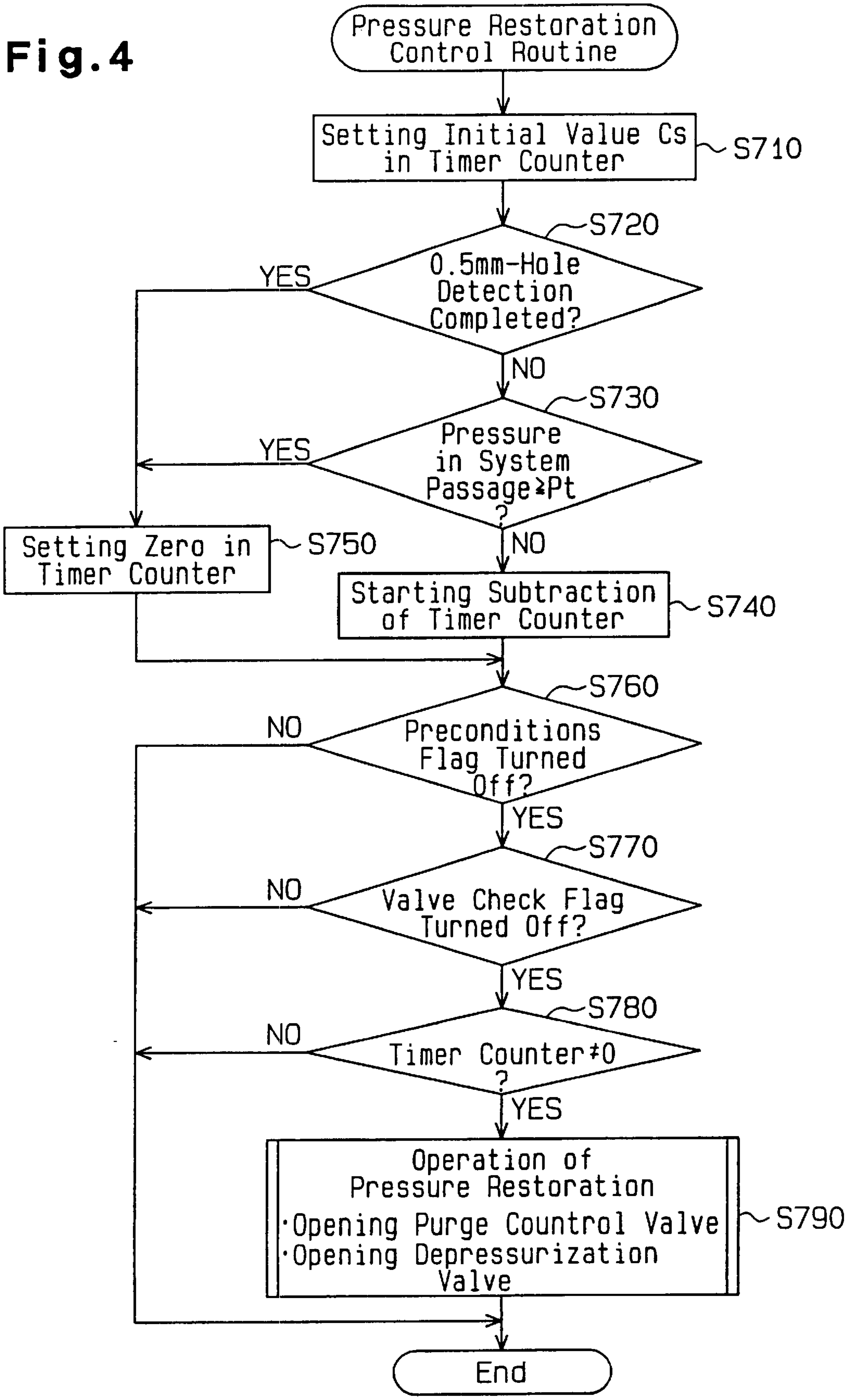
FIG. 4 is a flowchart of a pressurization routine according to one embodiment.

The pressure restoration routine of FIG. 4 will now be described.

In the present invention, detection of 0.5 mm holes is performed when no 1.0 mm hole is found after reducing the pressure in the system passage. The pressure restoration routine is executed prior to, for example, detection of 0.5 mm holes.

The reason for executing the pressure restoration routine is as follows.

The detection of 0.5 mm holes is performed when no 1.0 mm hole is found. If there is a 0.5 mm hole in the system passage, the pressure in the depressurized system passage gradually changes because of the leakage from the 0.5 mm hole. Therefore, it takes a relatively long time until the pressure in the system passage is stable for a predetermined period after the detection of 1.0 mm holes is performed (the broken line (h) of FIG. 5). Accordingly, the 0.5 mm-hole detection is not quickly performed after the 1.0 mm-hole detection is performed. Therefore, it is necessary to restore the pressure in the system passage substantially to the level of the atmosphere to stabilize the pressure in the system passage quickly. Therefore, when a test is demanded again, the pressure in the system passage is restored.

At step S710 of the pressure restoration routine, the ECU 50 sets an initial value Cs in a timer counter (subtraction counter) that counts the execution time of the pressure restoration. The initial value Cs is set at the time t0 at which the precondition flag is turned on.

At step S720, the ECU 50 judges whether the 0.5 mm-hole detection is completed. When the 0.5 mm-hole detection is completed, there is no need to restore the pressure, and the operation proceeds to step S750. When the 0.5 mm-hole detection is not completed, the operation proceeds to step S730.

At step S750, the ECU 50 resets the timer counter to zero.

At step S730, the ECU 50 judges whether the pressure P in the system passage is greater than a predetermined level Pt, which is close to atmosphere pressure. That is, at step S730, whether the pressure restoration is completed is judged. If the outcome of step 730 is positive (YES), the procedure moves to step S750 and resets the timer counter to zero. If the outcome of step S730 is negative (NO), the ECU 50 performs step S740.

At step S740, the ECU 50 starts subtraction of the timer counter. Subsequently, the ECU 50 judges whether the conditions for executing the pressure restoration operation are fulfilled at steps S760–S780.

At step S760, the ECU 50 checks the state of the precondition flag. When the precondition flag is turned off (YES), the ECU 50 checks the state of a valve check flag at step S770. When the valve check flag is turned off (YES) at S770, the procedure moves on to step S780. At step 780, the ECU 50 checks the current value of the timer counter. When the value of the timer counter is not zero (YES), the procedure goes to step S790. At step S790, the ECU 50 turns on the pressure restoration flag and executes the pressure restoration operation.

When there is a NO-judgement at any of steps S760–S780, the routine is temporarily terminated.

The procedure at step S790 is executed when YES is the outcome of every step S760–S780, that is, when the leakage detection period is finished (the precondition flag is turned off), the diagnosis period of the atmosphere intake valve 72*a* and the depressurization control valve 80*a* is finished (the valve check flag is turned off), and the value of the timer counter is greater than zero.

At step S790, the ECU 50 opens the atmosphere intake valve 72*a* and the depressurization control valve 80*a* and closes the purge control valve 71*a*. This quickly makes the pressure P in the system passage close to atmospheric pressure. Then, the preconditions for 0.5 mm-hole detection are fulfilled at the time t5, and the next detection is started. The broken line of FIG. 5(*h*) shows the change of pressure in the system passage when the pressure restoration operation is not performed. In this case, the preconditions for 0.5 mm-hole detection are fulfilled at the time t7, which starts the next detection. That is, the operation of pressure restoration shortens the wait time by a period of the time t7–t5.

In the present embodiment, the pressure P in the system passage is stabilized in a short period, and the preconditions for the following testing procedure are quickly fulfilled, which increases the frequency of the testing.

The present embodiment has the following advantages.

(1) The pressure P in the system passage is quickly restored near the atmosphere pressure after the leakage detection and testing of the atmosphere intake valve 72*a* and the depressurization control valve 80*a*. Therefore, when there is a request for performing the test again, the pressure in the system passage is more likely to be stabilized for a predetermined period. This increases the frequency and accuracy of testing.

(2) The pressurization of the system passage for testing and the operation of pressure restoration are facilitated by the various control valves.

The present embodiment may be varied as follows.

The position of the pressure sensor 32 may be changed as long as the pressure in the system passage is detected. For example, the pressure sensor 32 may be located in the canister 40.

The testing of the control valves may be omitted. In this case, the pressure restoration control is performed after the leakage detection.

The pressure restoration control routine may be executed when the 0.5-hole detection is cancelled.

The predetermined value Pth may be greater than the atmospheric pressure. In this case, the Pt at step S370 is slightly greater than the atmospheric pressure.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A method for testing a purge system that purges fuel vapor in a fuel tank to an intake passage of an engine through a system passage connected with the fuel tank, wherein the purge system includes the fuel tank, the system passage, a first valve and a second valve, the method comprising:

starting the testing when the pressure in the purge system is stable for a predetermined period;

changing the pressure in the purge system to a first predetermined pressure that is lower than the atmospheric pressure;

sealing the purge system;

monitoring the change of the pressure in the sealed purge system and detecting leakage of fuel vapor from the purge system;

evaluating a result of the monitoring;

demanding that the testing of the purge system be restarted when the result is improper;

restoring the pressure of the purge system substantially to the atmospheric pressure when a restart of the testing is demanded, wherein the first valve is located between the system passage and the intake passage to purge fuel vapor to the intake passage and the second valve disconnects the system passage from the atmosphere, wherein the step of changing the pressure in the purge system includes opening the first valve and closing the second valve so that the system passage is connected to the intake passage, wherein the step of changing the pressure includes monitoring the change of the pressure in the purge system and diagnosing the first valve substantially simultaneously with changing the pressure, wherein the step of sealing the purge system includes monitoring the change of the pressure in the purge system and diagnosing the first valve substantially simultaneously with sealing the purge system.

2. A method for testing a purge system that purges fuel vapor in a fuel tank to an intake passage of an engine through a system passage connected with the fuel tank, wherein the purge system includes the fuel tank, the system passage a first valve and a second valve, the method comprising:

starting the testing when the pressure in the purge system is stable for a predetermined period;

changing the pressure in the purge system to a first predetermined pressure that is lower than the atmospheric pressure;

sealing the purge system;

monitoring the change of the pressure in the sealed purge system and detecting leakage of fuel vapor from the purge system;

evaluating a result of the monitoring;

demanding that the testing of the purge system be restarted when the result is improper;

restoring the pressure of the purge system substantially to the atmospheric pressure when a restart of the testing is demanded, wherein the first valve is located between the system passage and the intake passage to purge fuel vapor to the intake passage and the second valve disconnects the system passage from the atmosphere, wherein the step of changing the pressure in the purge system includes opening the first valve and closing the second valve so that the system passage is connected to the intake passage; and controlling the second valve prior to the restoring step and then monitoring the change of the pressure in the purge system and diagnosing the second valve.

3. A method for testing a purge system that purges fuel vapor in a fuel tank to an intake passage of an engine through a system passage, which is connected with the fuel tank, wherein the purge system includes the fuel tank, the system passage, first and second valves, means for maintaining the pressure in the fuel tank within a predetermined pressure range when a testing of the purge system is not being performed, and means for releasing negative pressure in the fuel tank, wherein the first valve is located between the system passage and the intake passage to purge fuel vapor to the intake passage and the second valve disconnects the system passage from the atmosphere, the method comprising:

forbidding testing of the purge system when the rate of change of the pressure in the fuel tank is greater than or equal to a predetermined threshold value;

starting the testing when the rate of change of the pressure in the fuel tank is less than the predetermined threshold value;

changing the pressure in the purge system to a first predetermined pressure that is lower than the atmospheric pressure;

sealing the purge system;

monitoring the change of the pressure in the sealed purge system, detecting leakage of fuel vapor from the purge system;

evaluating a result of the monitoring;

demanding that the testing of the purge system be restarted when the result is improper; and restoring the pressure of the purge system substantially equal to the atmospheric pressure to advance the timing for restarting testing in the subsequent cycle when a restart of the testing is demanded, wherein the step of changing the pressure in the system passage includes opening the first valve and closing the second valve for connecting the system passage to the intake passage, wherein the restoring step includes controlling the means for releasing negative pressure in the fuel tank and opening the second valve to expose the purge system to the atmosphere pressure.

4. A testing apparatus for a purge system that purges fuel vapor in a fuel tank to an intake passage of an engine through a system passage connected with the fuel tank, the apparatus comprising:

the fuel tank;

the system passage including a canister for temporarily retaining fuel vapor generated in the fuel tank, a pressure sensor for detecting the pressure in the purge system;

a first valve for setting the pressure in the purge system to a predetermined value;

a second valve for sealing the purge system;

means for maintaining the pressure in the fuel tank within a predetermined pressure range when a testing of the purge system is not being performed, wherein the means for maintaining the pressure in the fuel tank is located between the fuel tank and the canister;

means for releasing negative pressure in the fuel tank, wherein the means for releasing releases negative pressure from the fuel tank when the testing of the purge system is interrupted; and a controller, which monitors a signal from the pressure sensor and controls the first and second valves, wherein the controller forbids testing of the purge system when the rate of change of the pressure in the fuel tank is greater than or equal to predetermined threshold value, wherein the controller permits testing of the purge system when the rate of change of the pressure in the fuel tank is less than the predetermined threshold value and when the pressure in the purge system is stable for a predetermined period, and the controller sets the pressure in the purge system by controlling the first and second valves to the predetermined value, and then the controller seals the purge system and detects leakage of fuel vapor from the purge system by monitoring the change of the pressure in the sealed purge system, wherein the controller evaluates a result of the detection and demands that the testing of the purge system be restarted when the result is improper, and wherein the controller restores the pressure of the purge system by controlling the means for releasing negative pressure in the fuel tank to advance the timing for restarting testing in the subsequent cycle when a restart of the testing is demanded.

5. The apparatus according to claim 4, wherein the controller restores the pressure in the purge system substantially to atmospheric pressure at least when the pressure in the purge system is unstable for a predetermined period after a restart of the testing is demanded.

6. The apparatus according to claim 4, wherein the controller restores the pressure in the purge system substantially to atmospheric pressure when instructed to perform a subsequent test.

7. The testing apparatus according to claim 4, wherein the first valve includes an atmosphere intake valve for applying the atmospheric pressure to the canister, and the second valve includes a purge control valve, which is located between the canister and the intake passage, wherein the purge control valve changes the amount of fuel vapor purged from the canister to the intake passage, wherein the means for maintaining the pressure in the fuel tank includes a depressurization control valve, which is located between the fuel tank and the canister, the testing apparatus further comprising:

a pressure sensor, which is located in the fuel tank and which detects pressure in the fuel tank and the system passage, wherein the controller monitors a signal from the pressure sensor and controls the atmosphere intake valve, the purge control valve, and the depressurization control valve, wherein the controller changes the pressure in the system passage and the fuel tank to a predetermined first pressure by opening the purge control valve, closing the atmosphere intake valve, and opening the depressurization control valve when the pressure in the system passage and the fuel tank is stable for a predetermined period, wherein the controller seals the system passage and the fuel tank by closing the purge control valve and the atmosphere intake valve and opening the depressurization control valve when the pressure in the system passage and the fuel tank reaches the predetermined first pressure, wherein the controller detects leakage of the fuel vapor in the system passage and the fuel tank by observing the change of the pressure in the sealed system passage and the fuel tank, wherein the controller evaluates a result of the detection and demands that the testing of the purge system be restarted when the result is improper, and wherein the controller restores the pressure in the system passage and the fuel tank substantially to atmospheric pressure by closing the purge control valve and opening the atmosphere intake valve and the depressurization control valve when a restart of the testing is demanded.

8. A testing apparatus for a purge system that purges fuel vapor in a fuel tank to an intake passage of an engine through a system passage connected with the fuel tank, the apparatus comprising:

a pressure sensor for detecting the pressure in the system passage; and a controller, which starts testing leakage of fuel vapor from the system passage by causing a diagnosing pressure to be introduced to the system passage when the pressure in the system passage is stable for a predetermined period, wherein the controller causes the system passage to be sealed to detect leakage of fuel vapor from the system passage by monitoring the change of the pressure in the sealed system passage and, wherein the controller causes the diagnosing pressure to be released from the system passage when a re-testing is demanded during the testing.

9. The apparatus according to claim 8, wherein the controller causes the diagnosing pressure to be released in order to start the re-testing more quickly when the pressure in the system passage is stable for a predetermined period.

10. The apparatus according to claim 8, wherein the purge system further includes a purge control valve located between the system passage and the intake passage, for controlling an amount of fuel vapor purged to the intake passage; and an atmosphere intake valve for selectively connecting the system passage with atmospheric pressure region; wherein the controller causes the diagnosing pressure to be introduced to the system passage by opening the purge control valve and closing the atmosphere intake valve; wherein the controller causes the system passage to be sealed by closing the purge control valve and the atmosphere intake valve and, wherein the controller causes the diagnosing pressure to be released by opening the atmosphere intake valve.

11. The apparatus according to claim 8, wherein the purge system further includes a canister, which temporarily retains fuel vapor generated in the fuel tank; an atmosphere intake valve for applying atmospheric pressure to the canister; a purge control valve, located between the canister and the intake passage, for changing the amount of fuel vapor purged from the canister to the intake passage; and a depressurization control valve for changing the degree of communication between the fuel tank and the canister; wherein the controller causes the diagnosing pressure to be introduced to the system passage by opening the purge control valve, closing the atmosphere intake valve, and opening the depressurization control valve; wherein the controller causes the system passage to be sealed by closing the purge control valve and the atmosphere intake valve and opening the depressurization control valve; and wherein the controller causes the diagnosing pressure to be released by opening the atmosphere intake valve and the depressurization control valve.

12. A method for testing a purge system that purges fuel vapor in a fuel tank to an intake passage of an engine through a system passage connected with the fuel tank, the method comprising:

introducing a diagnosing pressure to the system passage when the pressure in the system passage is stable for a predetermined period;

sealing the system passage;

monitoring the change of the pressure in the sealed system passage to detect leakage of fuel vapor from the system passage; and releasing the diagnosing pressure from the system passage when a re-testing is demanded during the testing.

* * * * *